March 17, 1959 H. F. McKENNEY ET AL 2,878,327
HIGH GAIN MAGNETIC AMPLIFIER
Filed Nov. 6, 1956
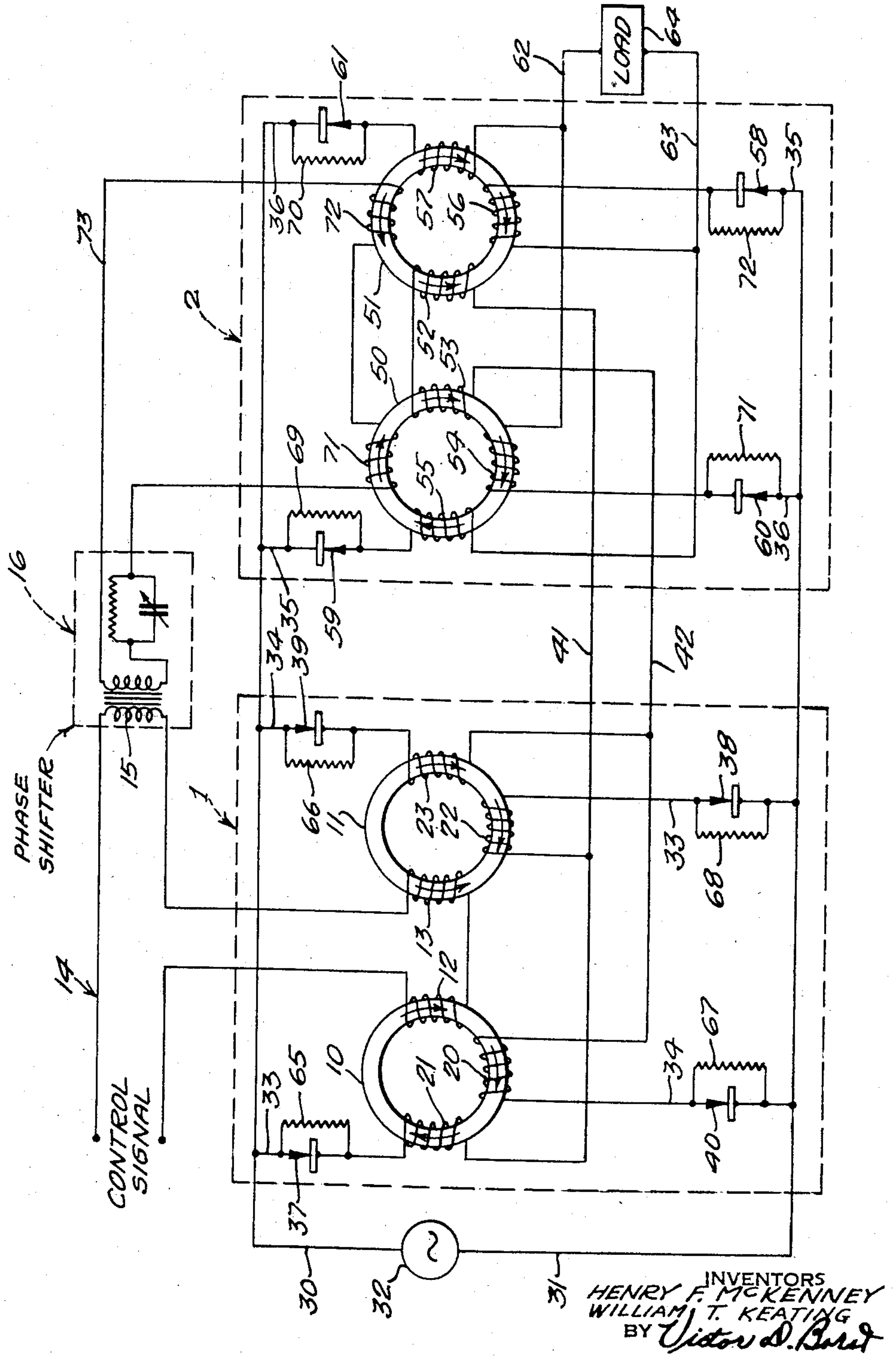
INVENTORS
HENRY F. McKENNEY
WILLIAM T. KEATING
BY Victor D. Borst
ATTORNEY

United States Patent Office 2,878,327

Patented Mar. 17, 1959

2,878,327

HIGH GAIN MAGNETIC AMPLIFIER

Henry F. McKenney, Weston, Mass., and William T. Keating, St. Albans, N. Y., assignors to Sperry Rand Corporation, Ford Instrument Company Division, Long Island City, N. Y., a corporation of Delaware Application November 6, 1956, Serial No. 620,757

3 Claims. (Cl. 179—171)

This invention relates to electrical amplifying systems employing magnetic amplifiers of the saturable core reactor type, and particularly, to bridge type half-wave magnetic amplifiers having means to eliminate negative feedback in their signal circuits.

The basic half-wave bridge type magnetic amplifier is characterized by a bridge network for each stage comprising two reactors connected in parallel across the line in series with similarly poled half-wave rectifiers so that they are both pulsed by the same half-wave of the line voltage. Each reactor has split windings and one part of each winding is connected in series with a part of the other winding. The control current which governs the saturation of the reactor magnetic circuits of the first stage acts differentially or in a push-pull relation with respect to the reactor windings to effect a differential flux preconditioning of the two magnetic paths on the off-half cycle of the reactor windings. The control windings after the first stage are connected for energization across the branch circuits between the two reactor windings of the preceding stage. This type of magnetic amplifier is often employed for servo systems requiring a rapid response in the amplifier output to weak input signals. Such amplifiers have an inherent weakness brought about by a relatively low overall gain due to negative feedback. Even though rectifiers are provided in the line circuits of the amplifier, the magnetic circuits in the bridge networks while the cores are unsaturated cause an unavoidable back voltage to appear in their control windings during both cycles of the applied voltage. During the reset portion of the normal line cycle, the current caused by this back voltage in the control circuit opposes the signal current which is weakened thereby.

As contemplated by this invention, there is provided an auxiliary winding, hereinafter referred to as a search winding, disposed on each of the magnetic circuits of the second bridge network and these search windings, connected in series have induced therein a voltage which is made equal in magnitude by selected circuit elements but of opposite phase to the back voltage unavoidably induced in the control windings of the first stage. A net cancellation of the negative feedback voltage in the control circuit of the first stage is effected by vectorially adding the two voltages after adjusting the phase relationship to exactly 180 electrical degrees by means of a phase shifter.

The features of the invention will be understood more clearly from the following detailed description taken in conjunction with the accompanying drawing which is a schematic diagram of a two stage half-wave bridge magnetic amplifier modified for high gain.

Referring to the figure, there is provided two saturable magnetic bridge networks 1 and 2 for the schematically illustrated two stage amplifier. Bridge network 1 includes two closed saturbale magnetic ring cores 10 and 11 on which there are disposed oppositely wound control windings 12 and 13, respectively. A control signal circuit 14 comprises a series connection of the winding 12, the winding 13 and an output winding 15 of a conventional phase shifter 16. Disposed on the ring cores 10 and 11 are reactor windings 20 and 21 and reactor windings 22 and 23, respectively. Connected to A. C. lines 30 and 31 which are energized by an alternating supply generator 32 are four branch circuits 33, 34, 35 and 36. Branch circuit 33 comprises a series circuit of a half-wave rectifier 37 poled away from line 30, the winding 21, the winding 22 and a half-wave rectifier 38 poled toward line 31. Branch circuit 34 comprises a series circuit of a half-wave rectifier 39 poled away from line 30, the winding 23, the winding 20 and a half-wave rectifier 40 poled toward line 31. The output of the first amplifier stage appears between conductors 41 and 42 which are connected respectively to the junction points between the reactor windings of bridge network 1. Bridge network 2 includes two closed saturable magnetic ring cores 50 and 51 on which respectively are dipsosed oppositely wound control windings 52 and 53. An input circuit to the bridge network 2 comprises in series the windings 52 and 53 and conductors 41 and 42. Disposed on the ring cores 50 and 51 are reactor windings 54 and 55 and reactor windings 56 and 57, respectively. Branch circuit 35 comprises a series circuit of a half-wave rectifier 58 poled away from line 31, the winding 56, the winding 55 and a half-wave rectifier 59 poled toward line 30. Branch circuit 36 comprises a series circuit of a half-wave rectifier 60 poled away from line 31, the winding 54, the winding 57 and a half-wave rectifier 61 poled toward line 30. The output voltage of bridge network 2 appears across conductors 62 and 63 which are connected respectively to the junction points between the reactor windings. The output circuit is shown as terminated in a load 64. The two reactor windings on each of the cores 10, 11, 50 and 51, are wound and sensed to induce similarly directed fluxes in the individual cores.

The half-wave rectifiers are disposed in each branch circuit and those for each stage are poled in the same direction so that both reactor windings utilize the same half-cycle of the alternating supply voltage, while for alternate stages these rectifiers are poled in opposite directions so that alternate stages use alternate half-cycles. In shunt with the half-wave rectifiers 37, 39, 40, 38, 59, 61, 60 and 58 are resistors 65, 66, 67, 68, 69, 70, 71 and 72, respectively, of selected values to control the back current on the off half-cycle with zero signal input and so serve as biasing resistors to bring the operating point on the hysteresis curve to the desired quiescent level. Obviously, auxiliary bias windings in known circuitry may also be used to accomplish the desired balancing. The control windings in each stage, as stated, are connected in a series opposition circuit and have push-pull relationship to the two reactor windings in each stage. A control signal current during the off half-cycle of supply alternating voltage will precondition the state of magnetism in the two associated reactor cores relative to their quiescent level.

Over both cycles of the supply alternating voltage when the reactor cores are unsaturated, a back voltage is induced by transformer action in the control winding associated with that core. This back voltage is directed in a manner to effect negative feedback. However, such back voltages induced in the control circuit of the first stage may be cancelled out by introducing therein another identical voltage with opposite phase. Accordingly search windings 71 and 72 are disposed respectively on reactor cores 50 and 51 and these windings are connected in series opposition to the control circuit 14 through phase control means such as the phase shifter network 16. Circuit element values are selected to equate the magnitude of the search voltage induced in the control circuit 14 to the back voltage induced therein by currents in reactor windings 20, 21, 22 and 23. The phase of the induced search voltage is adjusted by circuit elements in the phase shifter 16 to be exactly 180 electrical degrees out of phase with the back voltage in circuit 14. By elimination of the negative feedback current in the control circuit of the first stage, the gain of the amplifier is thereby improved. The negative feedback voltage induced in the control windings 52 and 53 of the second stage by transformer action from their associated reactor windings does not greatly depress the gain of that stage because the output circuit impedances in the first stage is high by virtue of the reverse impedances of the series rectifiers. Hence only small negative feedback currents can flow in the control windings beyond the first stage.

While a two stage amplifier is disclosed for purposes of illustration it is readily apparent that the invention can be incorporated in multistage amplifiers of more than two stages. It is to be understood that various modifications of the invention other than those above dedescribed may be effected by persons skilled in the art without departing from the principle and scope of the invention as defined in the appended claims.

What is claimed is:

1. A multistage magnetic amplifier each stage comprising a pair of closed magnetic circuits, two reactor windings inductively disposed on each magnetic circuit, an alternating current line, two branch circuits connected in parallel across the line, each branch circuit including in series one of the reactor windings on each of said magnetic circuits, two unidirectional conducting devices in each branch circuit, said devices being poled in the same direction in each stage, the devices for successive stages being oppositely poled, a control circuit including two control windings, one control winding disposed on each magnetic circuit and the two control windings being arranged in push-pull flux relationship with respect to the two magnetic circuits, each stage after the first stage having means conductively connecting its control circuit to the branch circuits of the immediately preceding stage at points between the two windings in each branch circuit of the preceding stage and a feedback control circuit coupled to the control circuit in the first stage, said feedback control circuit including a pair of search windings disposed inductively in push-pull flux relationship on the pair of closed magnetic circuits in a succeeding stage, and a phase shifter adapted to adjust the phase of the feedback control voltage to an 180 electrical degrees differential with respect to the back voltage induced in the control circuit through transformer action by the reactor windings in said first stage.

2. A multistage magnetic amplifier as claimed in claim 1 wherein there is provided a transformer to couple the said feedback control circuit to the said control circuit.

3. A multistage magnetic amplifier, each stage comprising a pair of closed magnetic circuits, a reactor winding inductively disposed on each magnetic circuit, a source of alternating current, said reactor windings being connected to said source of alternating current in parallel branch circuits, a control circuit including a control winding on each magnetic circuit and arranged in push-pull flux relation to the two reactor windings, a unidirectional conducting device in each branch circuit, said devices being poled in the same direction for the branch circuits of each stage and the pairs of devices for successive stages being oppositely poled, each stage after the first stage having means conductively connecting its control circuit to the branch circuits of the preceding stage and a feedback control circuit coupled to the control circuit in the first stage, said feedback control circuit including a pair of search windings disposed inductively in push-pull flux relationship on the pair of closed magnetic circuits in a succeeding stage, and a phase shifter adapted to adjust the phase of the feedback control voltage to an 180 electrical degrees differential with respect to the back voltage induced in the control circuit through transformer action by the reactor windings in said first stage.

References Cited in the file of this patent

UNITED STATES PATENTS

| | | |
|---|---|---|
| 2,464,639 | Fitzgerald | Mar. 15, 1949 |
| 2,730,574 | Belsey | Jan. 10, 1956 |

FOREIGN PATENTS

| | | |
|---|---|---|
| 573,793 | Great Britain | Dec. 6, 1945 |

OTHER REFERENCES

Geyger text, "Magnetic Amplifier Circuits," published Jan. 29, 1954, pp. 138–143, 193, 194.